United States Patent [19]

Radkowski et al.

[11] 4,072,473
[45] Feb. 7, 1978

[54] SELF-EXTINGUISHING MATCH AND METHOD OF MANUFACTURE

[75] Inventors: Stanley J. Radkowski, Wilbraham; John M. Lawrence, Monson; Enever Naggar, Longmeadow; Raymond W. Dunham, Springfield, all of Mass.

[73] Assignee: Diamond International Corporation, New York, N.Y.

[21] Appl. No.: 672,492

[22] Filed: Mar. 31, 1976

[51] Int. Cl.² ............................ C06F 3/02; B05C 1/00
[52] U.S. Cl. ............................................. 44/46; 44/47; 144/51
[58] Field of Search ................... 44/42, 43, 44, 46, 47; 144/51, 52, 58

[56] References Cited

U.S. PATENT DOCUMENTS

| 1,168,901 | 1/1916 | Nolan ........................ 44/47 |
| 1,191,545 | 7/1916 | Wey ........................... 44/47 |
| 1,666,547 | 4/1928 | Zomnir et al. ............. 144/51 |
| 1,762,344 | 6/1930 | Neklutin ..................... 144/51 |
| 3,838,989 | 10/1974 | Cohn .......................... 44/44 |

Primary Examiner—Carl F. Dees
Attorney, Agent, or Firm—Karl W. Flocks

[57] ABSTRACT

A match splint is impregnated with fire retardant chemicals during any of several steps of manufacture for adjusted fire retardancy control.

24 Claims, 11 Drawing Figures

| SPLINT ROLL STOCK | PUNCH PRESS | PARAFFIN APPLICATION | MATCHHEAD APPLICATION | FIRE RETARDANT DIP | DRYING CYCLE | BOOKMATCH ASSEMBLY MACHINE |
|---|---|---|---|---|---|---|
| POSITION #1 | POSITION #2 | POSITION #3 | POSITION #4 | POSITION #5 | POSITION #6 | POSITION #7 |

SELF-EXTINGUISHING MATCH AND METHOD OF MANUFACTURE

BACKGROUND OF THE INVENTION

This invention pertains to paper matches used in the form of book matches and particularly to applying fire retardancy characteristics to these matches to prevent secondary fires due to a continued burning after the desired period of use.

In the prior art where a self-extinguishing match has been disclosed, it has been the practice to use incombustible splints or to render these splints, which includes reference to cardboard or other fibrous material, to make "paper" matches incombustible by first dipping them into a fire retardant material and then applying flammable material at one end.

There is no known prior art for manufacturing self-extinguishing matches directly on a match making machine. U.S. Pat. No. 3,838,989 of Charles C. Cohn, granted Oct. 1, 1974, requires that the stem stock be treated with sodium silicate prior to die cutting or forming the match stems. This exposes the match stem edges which is the means for transmitting the flame. The flame is so feeble, however, that the stem has to be oriented to propagate the flame.

U.S. Pat. No. 256,920 issued to W. H. Pitt on Apr. 25, 1882, which is referred to as the Drunkard's Match, appears to be "hand" dipped in the fire retardant treatment from the opposite end of the match head. This would be impossible to accomplish on a match making machine. Also, this patent can only apply to wooden stick matches.

In the present invention, this procedure has been changed thereby forming a product different from the products of the prior art with better control over the fire retardancy characteristics obtainable.

SUMMARY OF THE INVENTION

The present invention allows impregnation of all surfaces, including the substrate of the match stem, with chemical fire retardants without detriment to the primary use and without a need to manipulate or orient the match to sustain the flame.

In the present invention the degree of fire retardancy and match characteristics are controlled by the steps in the process of manufacture and by adjusting the concentration and formulation of the ingredients of the chemical fire retardants.

In the present invention a non-abrasive chemical fire retardant can be applied at any of several positions on the match making machine including even before the die cutting operation. Use of certain flame retardants of the prior art, such as sodium silicate which is very abrasive, will result in abnormal wear, plugging and breakage of the cutting dies.

The present invention uses flame retardants which eliminate afterglow in the match stem and eliminates need for special treatment for this effect which is actually enhanced by some prior art retardants.

In the present invention the chemical flame retardant may be applied at any station of the match making operation with a preferred embodiment applying the chemical flame retardant treatment after applying the match head composition.

The present invention also includes means to control the amount of paraffin which is applied to the match splint and affects the flame characteristics.

BRIEF DESCRIPTION OF THE DRAWINGS

These as well as further advantages which are inherent in the invention will become apparent from the following description, reference being had to the accompanying drawings wherein.

DESCRIPTION OF THE PREFERRED EMBODIMENTS

Figure 1:
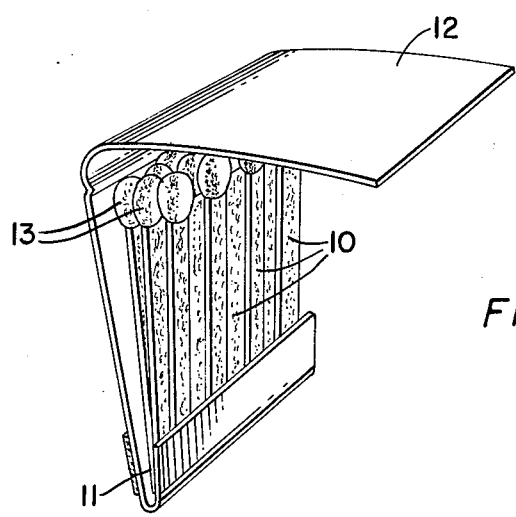
FIG. 1 shows a book of paper matches which is the finished product of the manufacturing process of the present invention.
Figure 2:
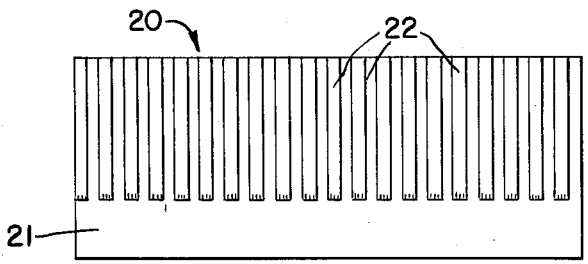
FIG. 2 is a comb of match splints used in the match making machine.

In the manufacture of paper book matches as illustrated in FIG. 1, there are a plurality of match splints 10 made of cardboard or hard paper, usually arranged in two parallel rows, projecting from an integral narrow marginal strip 11 to which is stapled a foldable flexible paper safety cover flap 12 with a striking surface attached thereto. The material of which the match splints is made is usually ordinary fibrous pulp board or paper modified by the addition of minor percentages of certain coloring and sizing agents. It is customary to manufacture the cardboard material from which the match splints 10 are cut by continuously forming elongated webs at a paper mill and shipping such webs in rolls 15 illustrated in position #1 of FIG. 4, to match making plants. There splints 22 are formed, i.e. die cut, by subjecting the webs to the die cutting action of a punch press 16 as in position #2, FIG. 4, or the like, to produce what is known in the trade as combs 20 as shown in FIG. 2, each of which consists of an elongated marginal strip 21, from which about one hundred match splints 22 may project. The combs 20 are affixed singly or in pairs by means of friction or spring loaded clips to an endless chain 25, as partially illustrated in FIG. 4A, which transports the combs 20 through the match making process.

Figure 4A:
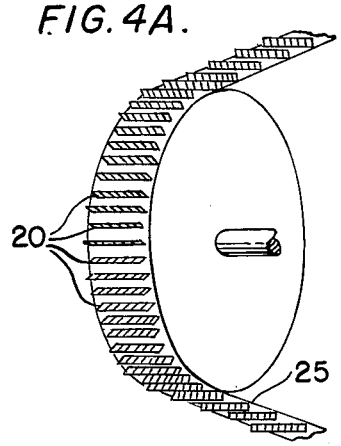
FIG. 4A is a partial perspective of the match combs on a belt and wheel of the match making machinery.
Figure 4:
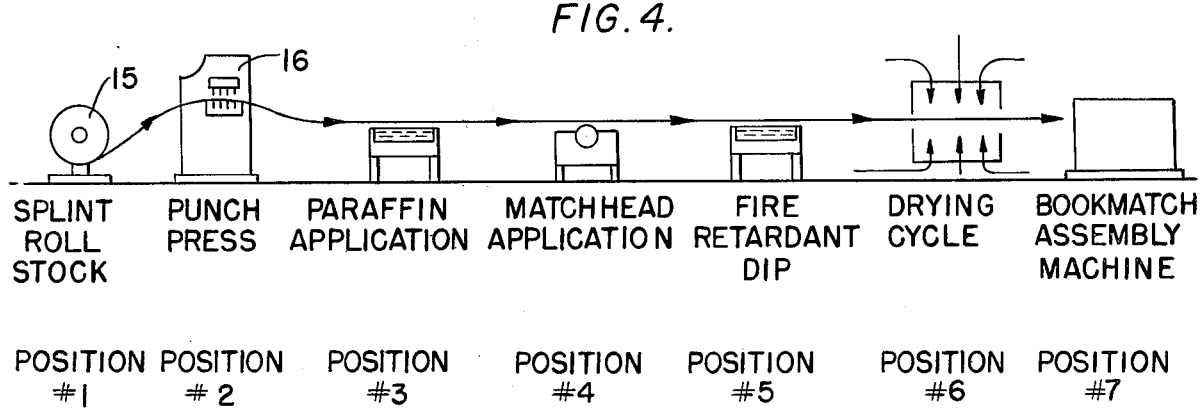
FIG. 4 is a book match manufacturing flow diagram for manufacturing the book matches of the present invention.

The outer free ends of splints 22 are impregnated with hot paraffin wax as in position #3 of FIG. 4. The purpose of the paraffin is to transmit the flame from the ignited pyrotechnic mixture forming the match head 13 to the body portion of the match splint 22. The present common method of applying the paraffin in the trade is to immerse the splints into an open pan containing hot paraffin. This method does not permit any degree of controlling the amount of paraffin which is absorbed through a wicking action by the porous match splint 22. In order to control the heat output and burn limits of the match splint, is is very important to control the amount of paraffin being absorbed.

Figure 5:
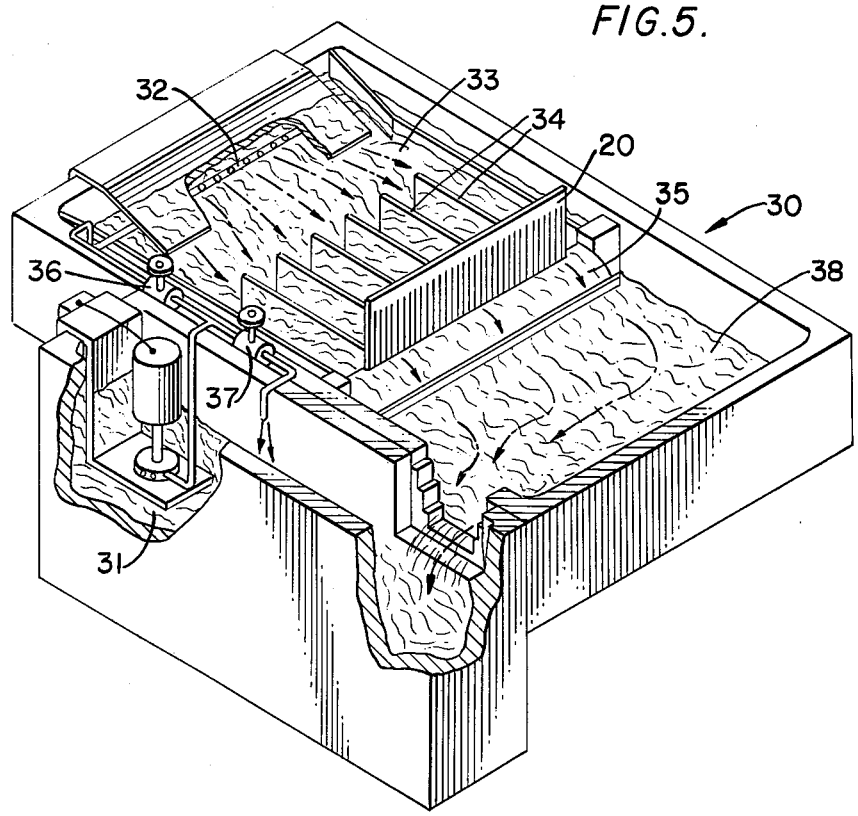
FIGS. 5, 6 and 7 are different embodiments of paraffin applicators for use with the match making machinery of the present invention.
Figure 6:
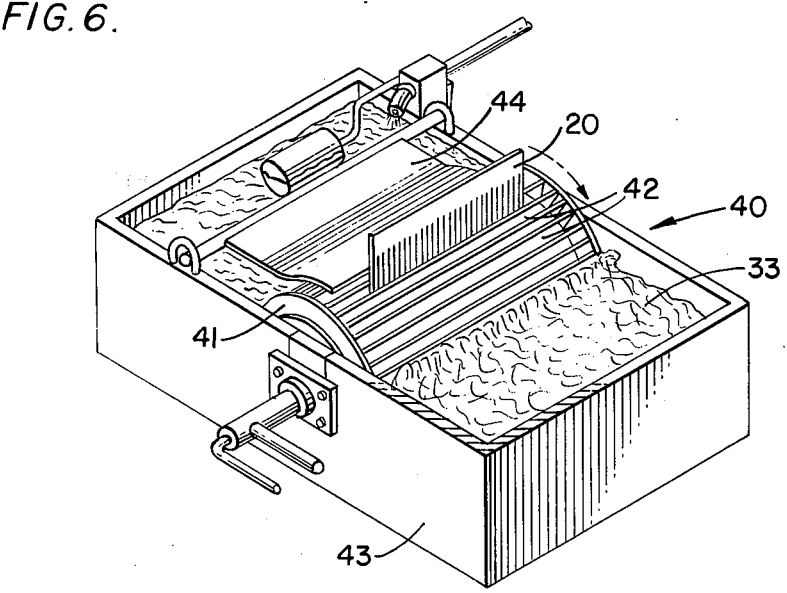
Figure 7:
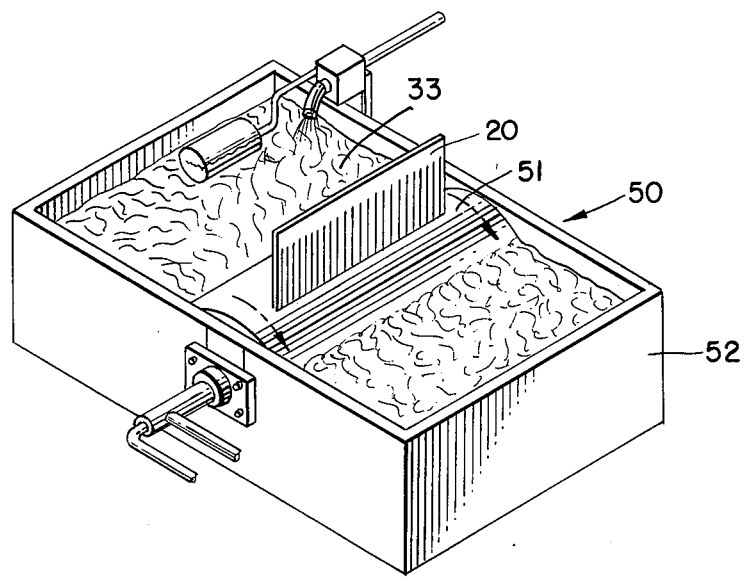

FIGS. 5, 6 and 7 depict novel paraffin applicators 30, 40 and 50 that can be used to control the amount of paraffin absorbed by the match stem 22. Controlling the amount of paraffin absorbed by the match splint is necessary in order to control the burn limits of the match splint and to minimize the amount of heat output of the burning match. All three devices are equally effective. The innovation represented in FIG. 5 illustrates the paraffin being pumped from reservoir 31 through a distribution pipe 32. The paraffin 33 is permitted to flow between parallel vertical baffles 34 in order to insure a uniform flow over a convex curved apron (weir) 35. The flow rate of the paraffin 33 over apron 35 is controlled by flow valve 36 and a by-pass valve 37. The flow rate approximates the speed of comb 20 across apron 35.

The combs 20, which are held in an endless chain 25, illustrated partially in FIG. 4A, pass over the dam or apron 35 in the same direction as the flow of paraffin 33 and on an incline that is tangent to the convexly curved apron 35. The depth of paraffin flowing over apron 35 determines the amount of paraffin 33 that is absorbed by comb 20. The excess (overflow) paraffin 33 is permitted to overflow from reservoir 38 into reservoir 31 and recycled.

An alternate and equally effective method of applying the paraffin 33 is illustrated in FIG. 6. In this paraffin applicator 40, a heated cylinder 41 with parallel pockets 42 rotates in a jacketed tank 43 containing hot paraffin 33. The paraffin 33 is raised into the parallel pockets 42 as the heated cylinder 41 is rotated in jacketed tank 43. A form fitting shoe 44 rides against the top of the parallel pockets 42 as they leave the surface of the paraffin 33 in the tank 43. The shoe 44 prevents the paraffin 33 from draining out of the pockets 42 before the comb 20 is immersed. The combs 20 which are held in the endless chain 25, travel over the cylinder 41 in the same direction in which the top of the cylinder is traveling and on a horizontal plane. The amount of paraffin 33 applied to the match stems 22 on the combs 20 is controlled by adjusting the height of the endless chain traveling above the rotating cylinder 41.

A third paraffin applicator 50 for applying the paraffin 33 is illustrated on FIG. 7. The principle employed here is similar to that explained in FIG. 6 above. Instead of a parallel pocketed cylinder 41, a smooth or rough cylinder 51 is used to transfer the hot paraffin from tank 52 onto comb 20. The heated cylinder is optional for this application; an unheated cylinder will suffice since the exposed portion of the cylinder 51 is only slightly out of the hot paraffin wax 33.

The above three described techniques for applying paraffin on the match splint result in a controlled deposition of between ⅛ to ⅜ inch of paraffin.

The paraffin coated match splints on combs 20 are then permitted to pass through a water based pyrotechnic composition, shown in position #4 of FIG. 4 and form what is known in the trade as "match heads" 13. The chemical flame retardant may be applied at any position on the match machine diagrammatically illustrated in FIG. 4, such as before position #1 at the paper mill, or otherwise between positions #1 and #2, between positions #2 and #3, between positions #3 and #4, and any position after #5 until before the actual match book is assembled.

Figure 8:
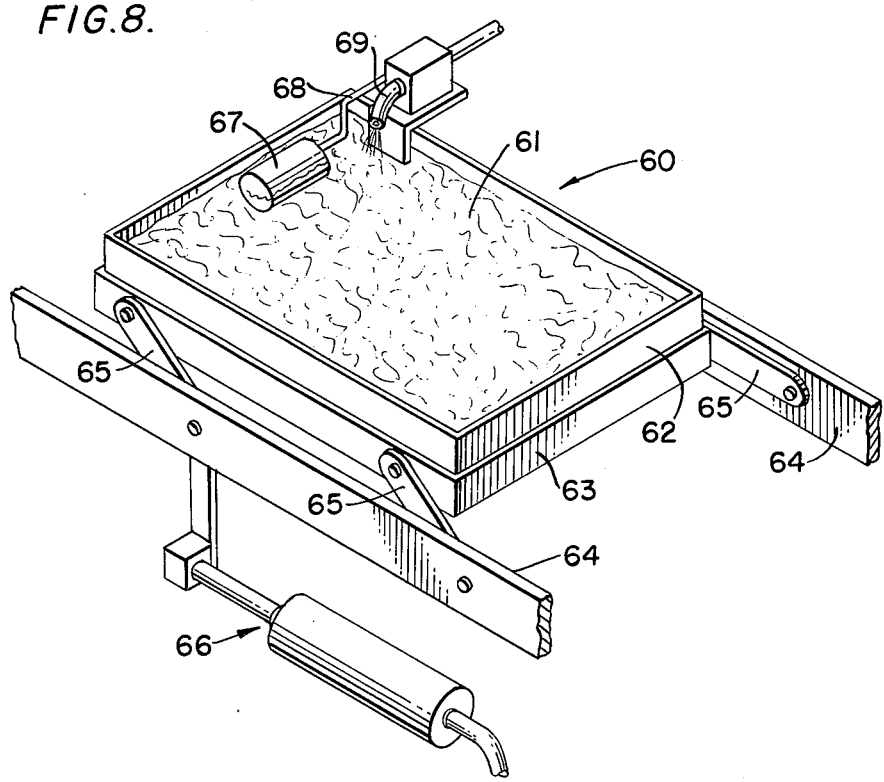
FIG. 8 is a fire retardant dipping pan for use with the match making machinery.

The preferred position for applying the water based flame retardant solution 61 on the comb 20 or match splint is after the match head 13 has partially dried or "cured" in position #5 of FIG. 4. The fire retardant dipping pan 60 is illustrated in FIG. 8. No prior treatment to the match splint is necessary (such as sizing, etc.) before the chemical fire retardant 61 is applied. All surfaces of the match stem 22 including the substrate if so desired can receive the treatment in order to be effective. In position #5 of FIG. 4, the fire retardant dipping pan 60 includes a tank 62 to hold the flame retardant solution 61 which is supported on a parallel action holder 63 connected to supports 64 by linkages 65 and to hydraulic controls 66 for controlling the height of tank 62 in relation to passing combs 20. A float 67 through linkage 68 controls replenishment of solution 61 through hose inlet 69 and maintains the proper height of the solution in relation to the passing combs 20 (not shown in FIG. 8).

Combs are not necessarily brought into each of the tanks of liquid through a circular path. They may be introduced into the liquid on a horizontal plane. Some match making machines operate on a sprocket rather than a wheel driving arrangement and therefore the endless chain is in a vertical festooned arrangement for drying purposes. This type of match machine would require a horizontal plane dipping arrangement.

The following examples, in which amounts of all materials are expressed in parts by weight, will illustrate various flame retardant formulations which are effective in practicing the present invention, it being understood that these examples are illustrative only and not limitative.

EXAMPLE 1 SERIES

| General Formulation | | |
|---|---|---|
| Weak Flame Retardant: | Ammonium Chloride | 0–20% |
| Strong Flame Retardants: | Monoammonium Phosphate | 0– 5% |
| | Diammonium Phosphate | 0– 5% |
| Remainder: | Water | |

To provide the match splint with even weak flame retardancy, a minimum of about 2% of at least one of the strong flame retardants is necessary in the solution. Larger quantities, of course, give greater degrees of flame retardancy. To obtain the minimum degree of flame retardancy desirable using a weak flame retardant, such as ammonium chloride, it would be necessary to have at least 15% of the ammonium chloride

| Specific Formulation A | |
|---|---|
| Ammonium Chloride | 15% |
| Monoammonium Phosphate | 2% |
| Diammonium Phosphate | 3% |
| Remainder Water | |
| Specific Formulation B | |
| Ammonium Chloride | 5% |
| Monoammonium Phosphate | 5% |
| Diammonium Phosphate | 1% |
| Remainder Water | |

EXAMPLE 2 SERIES

| General Formulation | |
|---|---|
| Ammonium Chloride | 0–20% |
| Monoammonium Phosphate | 0–20% |
| pH adjusted to 7.0 with Ammonium Hydroxide | |
| Remainder Water | |
| Specific Formulation | |
| Ammonium Chloride | 15% |
| Monoammonium Phosphate | 15% |
| Remainder Water | |
| Sufficient Ammonium Hydroxide to adjust | | pH to 7.0

EXAMPLE 3 SERIES

| General Formulation | |
|---|---|
| Strong Retardant: | |
| Diammonium Phosphate | 0–10% |
| Weak Retardants: | |
| Ammonium Sulfate | 0– 5% |
| Ammonium Chloride | 0– 5% |
| Boric Acid | 0– 2% |
| Borax | 0– 2% |

Although boric acid and borax are listed above as weak retardants, they are somewhat stronger than ammonium sulfate and ammonium chloride; if either were used by itself to provide a minimum strength fire retardant solution for purposes of the present invention, it would be necessary to use approximately 8–10% of either the borax or boric acid.

| Specific Formulation A | |
|---|---|
| Diammonium Phosphate | 5% |
| Ammonium Sulfate | 2% |
| Borax | 1% |
| Remainder Water | |
| Specific Formulation B | |
| Diammonium Phosphate | 10% |
| Ammonium Sulfate | 2% |
| Ammonium Chloride | 3% |
| Boric Acid | 1% |
| Borax | 1% |
| Remainder Water | |

EXAMPLE 4 SERIES

| General Formulation | |
|---|---|
| Diammonium Phosphate | 2–20% |
| Urea | 0–35% |
| Remainder Water | |

Where urea is used, it serves as both a wetting agent and as a weak flame retardant, but the urea should not be used by itself since even relatively large quantities of urea will not provide adequate flame retardancy.

| Specific Formulation A | |
|---|---|
| Diammonium Phosphate | 10% |
| Urea | 10% |
| Remainder Water | |
| Specific Formulation B | |
| Diammonium Phosphate | 5% |
| Remainder Water | |

EXAMPLE 5 SERIES

| General Formulation | |
|---|---|
| Ammonium Sulfate | 0–30% |
| Diammonium Phosphate | 0–10% |
| Monoammonium Phosphate | 0–10% |
| Surfactant -Sodium Dioctyl Sulfosuccinate | 0– 1% |
| Water-miscible Solvent - Acetone | 0– 5% |
| Remainder Water | |

This formulation illustrates the utilization of a water-miscible or water soluble aliphatic organic solvent, as well as the utilization of a surfactant, detergent or wetting agent. The use of either of these ingredients has a tendency to significantly improve penetration of the fire retardant composition into the body of the match splint, thereby providing enhanced absorption.

| Specific Formulation A | |
|---|---|
| Ammonium Sulfate | 5% |
| Diammonium Phosphate | 2% |
| Sodium Dioctyl Sulfosuccinate | 0.5% |
| Acetone | 4% |
| Remainder Water | |
| Specific Formulation B | |
| Ammonium Sulfate | 30% |
| Diammonium Phosphate | 10% |
| Monoammonium Phosphate | 10% |
| Sodium Dioctyl Sulfosuccinate | 1% |
| Acetone | 5% |
| Remainder Water | |
| Specific Formulation C | |
| Diammonium Phosphate | 2% |
| Monoammonium Phosphate | 5% |
| Acetone | 5% |
| Remainder Water | |

EXAMPLE 6 SERIES

| General Formulation | |
|---|---|
| Ammonium Sulfate | 0–30% |
| Diammonium Phosphate | 0–10% |
| Monoammonium Phosphate | 0–10% |
| Solvent - Glyoxal | 0–10% |
| Remainder Water | |
| Specific Formulation | |
| Ammonium Sulfate | 10% |
| Diammonium Phosphate | 8% |
| Monoammonium Phosphate | 4% |
| Glyoxal | 8% |
| Remainder Water | |

EXAMPLE 7 SERIES

| General Formulation | |
|---|---|
| Ammonium Sulfate | 0–30% |
| Diammonium Phosphate | 0–10% |
| Monoammonium Phosphate | 0–10% |
| Solvent - Isopropanol | 0–10% |
| Surfactant - Sodium Dihexyl Sulfosuccinate | 0– 1% |
| Remainder Water | |
| Specific Formulation A | |
| Ammonium Sulfate | 10% |
| Diammonium Phosphate | 5% |
| Monoammonium Phosphate | 5% |
| Isopropanol | 10% |
| Sodium dihexyl Sulfosuccinate | 1% |
| Remainder Water | |
| Specific Formulation B | |
| Ammonium Sulfate | 25% |
| Monoammonium Phosphate | 7% |
| Sodium Dihexyl Sulfosuccinate | 0.5% |
| Remainder Water | |

In general, the concentration of flame retardancy agents in the various formulations determines the degree of fire retardancy achieved. The adjuvants utilized therewith do have a beneficial effect, however, in improving the penetration and absorbency of the fire retardant salt into the body of the match splint. Thus, use of any of the formulations which do not use either or both the organic solvent and surfactant results, generally, in a surface coating treatment with only slight penetration of the chemical fire retardant solution into the splint interior. This condition results in only a partial fire retardancy of the match splint. On the other hand, incorporation of the water-miscible or water soluble aliphatic organic solvent and/or the surfactant into the formulation results in an improvement in the penetration and thereby an improvement in the fire retardancy and, depending on the concentration of the fire retardant chemicals utilized, can provide total fire retardancy properties.

It should be understood that the organic solvents and surfactants noted above are mentioned as exemplary only. Any water soluble or water-miscible organic solvent which is either volatile or non-flammable may be used, and there may be briefly mentioned alcohols, such as methanol, ethanol, diacetone alcohol, n-butanol, isobutanol, n-propanol, furfuryl alcohol, amino-2-methyl-1-propanol; alkyl esters, such as ethyl acetate, cellosolve acetate, ethylene glycol diacetate; aldehydes such as glyoxal and glutaric dialdehyde; glycols such as triethylene glycol, ethylene glycol, propylene glycol and hexylene glycol; and ketones such as acetone and cyclohexanone. Other useful solvents are methyl cellosolve, glycerine, cellosolve, butyl cellosolve, carbitol and dimethyl formamide. It is preferred to use the lower molecular weight alcohols such as methanol, ethanol, propanol, isopropanol, etc. The solvents are preferably used in an amount of 1-10% of the total fire retardant solution.

With regard to the surfactants, urea and certain anionic surfactants have been found to be particularly effective; sodium dioctyl sulfosuccinate and sodium dihexyl sulfosuccinate are exemplified. However, other surfactants, detergents and wetting agents, including cationic and non-ionic surfactants, may also be used. Among these may be briefly mentioned Aerosol AY (sodium diamyl sulfosuccinate), Tergitol Anionic 4 (sodium tetradecyl sulfate), Tergitol Anionic 08 (sodium 2-ethylhexyl sulfate), Triton X-100 (condensation product of ethylene oxide and alkylphenol), Aerosol 1B-45, Aerosol A-102, and Aerosol A-103.

The degree of fire retardancy control obtained in accordance with the present invention can even be adjusted to permit the match splint to self-extinguish even when held in a vertical position. This has been demonstrated in the present invention by igniting a match prepared in accordance with the present invention and holding it in a vertical position during the pyrolysis process. After the paraffin has been consumed in this position, the match will automatically self-extinguish.

After combs 20 have been dipped in the fire retardant solution 61 in position #5, the chain 25 passes to position #6 where combs 20 are subjected to a drying cycle and then to a position #7 where a book match assembly machine completes the process.

Figure 3A:
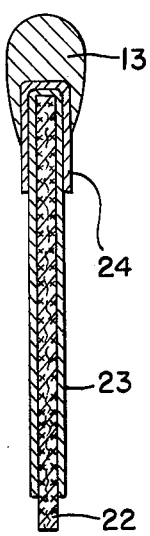
FIGS. 3A, 3B and 3C are very enlarged forms of match splints emphasizing the layers of material on the splints in different embodiments of the invention.
Figure 3B:
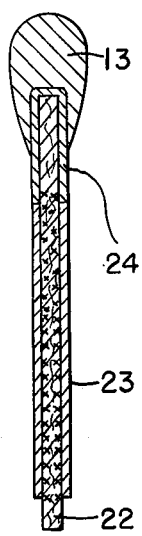
Figure 3C:
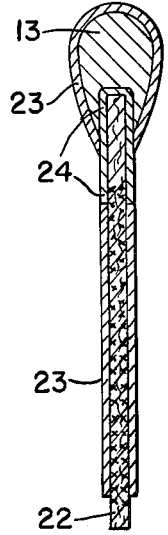

The completed splints 22 have the material applied as shown in any of the embodiments of FIGS. 3A, 3B or 3C dependent on where in the process the fire retardant solution 61 was applied. FIG. 3A illustrates splint 22 with flame retardant 23 applied before position #3 and then the layer of paraffin 24 for a limited distance along splint 22 and finally head 13 applied last. Although shown as a layer 23 on the surface of splint 22, it should be understood that dependent on the length of time dipped in solution 61 and the type of fire retardant formulation used, the layer 23 will soak into splint 22, as illustrated in FIGS. 3A, 3B and 3C, without deleterious effects on the operation of the match. In FIG. 3B, the flame retardant has been applied between positions #3 and #4 thereby forming flame retardant layer 23 on splint 22 but layer 23 is unable to cling to paraffin layer 24 and does not coat that paraffin cover area. In FIG. 3C, which is the embodiment of positions illustrated by FIG. 4 with the fire retardant dip taking place at position #5, fire retardant layer 23 also covers head 13 besides the part of splint 22 not previously covered by paraffin layer 24.

It will be obvious to those skilled in the art that various changes may be made without departing from the scope of the invention and the invention is not to be considered limited to what is shown in the drawings and described in the specification.

What is claimed is:

1. A self-extinguishing match comprising
   a match splint having opposite surfaces and opposite edges,
   a layer of paraffin extending from one end of said splint along only a portion of said splint to a point between said one end and the opposite end of said splint,
   an igniting head on said one end of said splint,
   chemical fire retardant material on said opposite surfaces and opposite edges of said splint from said one end and extending toward said opposite end further along said splint than said layer of paraffin.

2. The match in accordance with claim 1 wherein said chemical fire retardant material is impregnated into said splint.

3. A self-extinguishing match comprising
   a match splint having opposite surfaces and opposite edges,
   a layer of paraffin extending from one end of said splint along only a portion of said splint to a point between said one end and the opposite end of said splint,
   an igniting head on said one end of said splint,
   chemical flame retardant material on said opposite surfaces and opposite edges of said splint along said splint beyond the portion covered by said layer of paraffin.

4. The match in accordance with claim 3 wherein said chemical fire retardant material also covers said igniting head.

5. A method of manufacturing book matches of the self-extinguishing type comprising the steps of
   preparing match splint combs,
   mounting said combs on a conveying means with free ends of the match splints extending therefrom,
   moving said combs on said conveying means and partially dipping said combs in hot melted paraffin,
   partially dipping said combs in igniting match head material,
   dipping said combs to a point further up the combs beyond the farthest extent that paraffin will reach on the match splint combs in chemical fire retardant material in liquid form following any previous mentioned step after mounting said combs on a conveying means,
   drying the material on said combs,
   and assembling said combs into book match form.

6. The method of claim 5 further characterized by said step of dipping said combs in chemical fire retardant material performed after the dipping of said combs in hot melted paraffin.

7. The method of claim 5 further characterized by said step of dipping said combs in chemical fire retardant material performed after the dipping of said combs in hot melted paraffin and igniting match head material.

8. A method in accordance with claim 5, wherein said chemical fire retardant material comprises an aqueous solution consisting essentially of water, at least one flame retardant salt wherein the total quantity of flame retardant salt is sufficient to render said match splint flame retardant, and an adjuvant for facilitating the penetration of said flame retardant salt into said match splint.

9. A process in accordance with claim 8, wherein said penetration facilitating material comprises a water soluble or water-miscible organic solvent.

10. A process in accordance with claim 9, wherein said penetration assisting agent is a surfactant.

11. A process in accordance with claim 9, wherein said salt comprises diammonium phosphate, monoammonium phosphate, ammonium sulfate or a mixture thereof.

12. A match making apparatus comprising
means to form match splint combs,
means to apply paraffin following said match splint comb forming means,
means to apply igniting match head material following said paraffin applying means,
means to apply fire retardant material at any point in relation to one of said above mentioned means,
and means to dry the applications from said previous stated means.

13. The apparatus of claim 12 further characterized by
said means to apply fire retardant material following said means to apply paraffin.

14. The apparatus of claim 12 further characterized by
said means to apply fire retardant material following said means to apply igniting match head material.

15. The apparatus of claim 12 further characterized by
said means to apply paraffin including
a tank,
connecting first and second reservoirs,
a distributing pipe connected from said first reservoir with outlets into said tank,
a convex curved apron forming a dam between said distributing pipe outlets and said second reservoir,
and parallel baffles extending from said apron on the side opposite from said second reservoir.

16. The apparatus of claim 12 further characterized by
said means to apply paraffin including
a jacketed tank,
a heated cylinder mounted for rotation and partially immersed in said tank,
parallel pockets on said heated cylinder arranged transversely to the direction of rotation of said cylinder,
and a form fitting shoe extending upward and over a portion of said cylinder and bearing against said cylinder from one side of said cylinder with said cylinder rotating out from under said shoe.

17. The apparatus of claim 12 further characterized by
said means to apply paraffin including
a jacketed tank
a cylinder partially immersed in said tank and mounted for rotation,
and means to retain paraffin in melted form at a predetermined depth in said tank.

18. The apparatus of claim 17 further characterized by
said cylinder being a heated cylinder.

19. The apparatus of claim 17 further characterized by
said cylinder having a rough surface.

20. The apparatus of claim 17 further characterized by
said cylinder having a smooth surface.

21. The apparatus of claim 12 further characterized by
said means to apply fire retardant material including
a tank for holding a fire retardant solution,
parallel action mechanism supporting said tank and adjustable to change the height at which said tank is supported,
means to control adjustment of said parallel action mechanism,
and means to maintain the fire retardant solution at a predetermined depth in said tank.

22. A match in accordance with claim 2 wherein
said fire retardant material is selected from the group consisting of ammonium chloride, monoammonium phosphate, diammonium phosphate, ammonium sulfate, boric acid, borax, mixtures thereof, and mixtures thereof with urea.

23. A match in accordance with claim 3 wherein
said chemical fire retardant material is impregnated into said splint.

24. A match in accordance with claim 23 wherein
said fire retardant material is selected from the group consisting of ammonium chloride, monoammonium phosphate, diammonium phosphate, ammonium sulfate, boric acid, borax, mixtures thereof, and mixtures thereof with urea.

* * * * *